April 5, 1927.  W. STEPHENS  1,623,932
MACHINE FOR TESTING POROSITY OF INFLATABLE ARTICLES
Filed Nov. 28, 1921  3 Sheets-Sheet 3

Inventor
William Stephens

Patented Apr. 5, 1927.

1,623,932

UNITED STATES PATENT OFFICE.

WILLIAM STEPHENS, OF AKRON, OHIO, ASSIGNOR TO THE GOODYEAR TIRE & RUBBER COMPANY, OF AKRON, OHIO, A CORPORATION OF OHIO.

MACHINE FOR TESTING POROSITY OF INFLATABLE ARTICLES.

Application filed November 28, 1921. Serial No. 518,378.

My invention relates to an improved method of testing inflatable objects for porosity and to a machine for performing the testing operation.

Heretofore, it has been customary to test inflatable objects for porosity by inflating them to a limited degree and submerging them in a liquid. In testing such articles as tubes for pneumatic tires, it is impossible to inflate them to the pressure to which they are subjected in service and, therefore, many times a limited degree of porosity may be present during service conditions which is not discoverable by the previously practiced methods of testing.

My invention contemplates a method of testing in which the pneumatic tube, or other article, is slightly inflated and then deformed in order to stretch or tension its walls. This renders the test more effective in disclosing any porosity that may exist. The method of testing heretofore practiced is, therefore, supplemented by the stretching or tensioning of the walls of the article.

Fig. 1 of the accompanying drawing is a plan view, with portions broken away, of a machine for testing pneumatic tubes in accordance with my invention;

Figure 1:
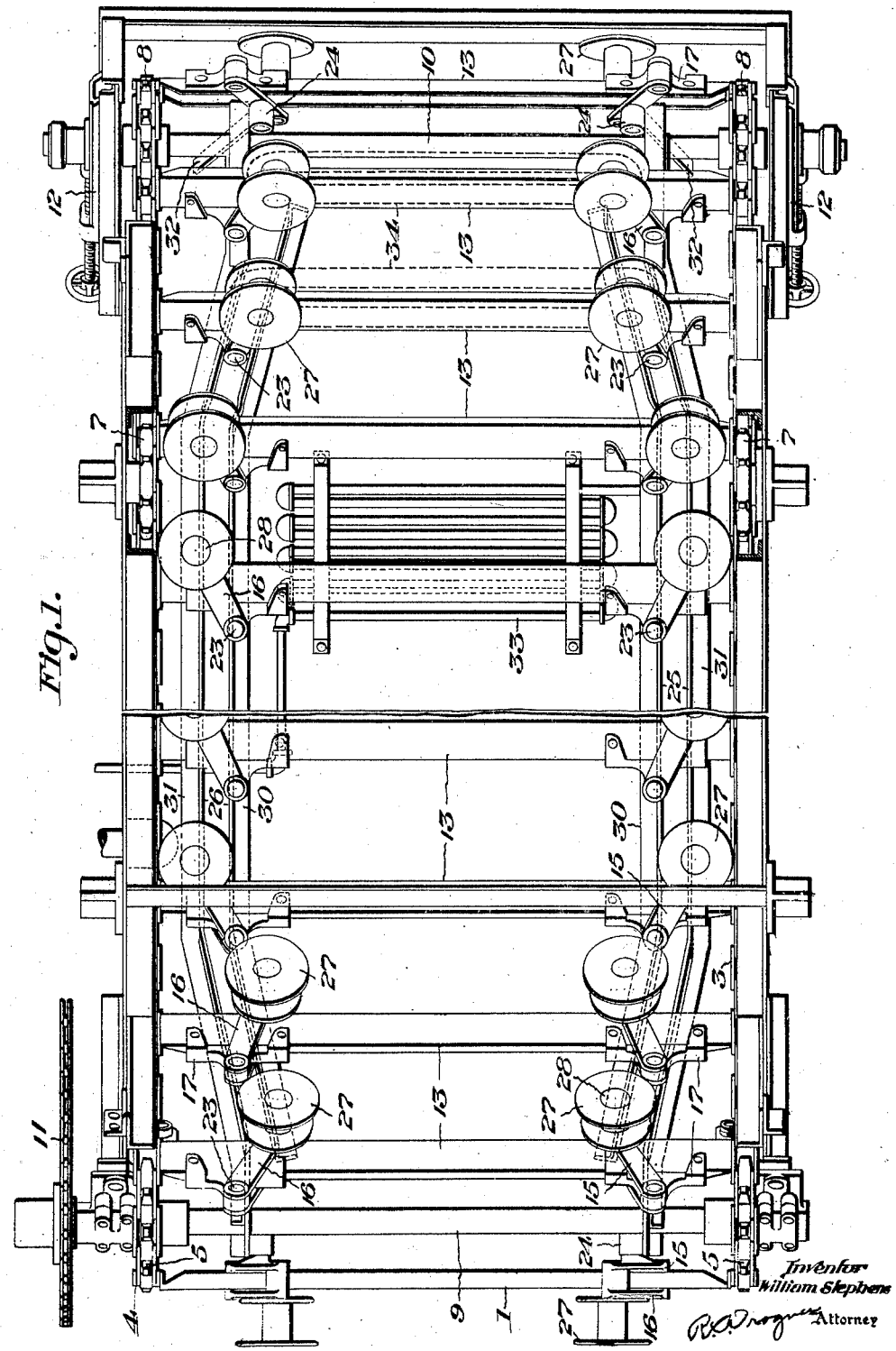

A machine that may be employed for testing pneumatic tubes in accordance with my invention is illustrated in the accompanying drawing and broadly comprises a tank 1 that is traversed by a conveyor mechanism 2 upon which the inflatable objects to be tested are mounted.

Since the tank and conveyor elements of the machine for practicing my method of testing may be of any suitable design, it is deemed unnecessary to give more than a general description of these elements.

The conveyor mechanism 2 comprises a pair of chains 3 and 4 that are mounted on opposite sides of the tank 1 and extend over sets of sprockets 5, 6, 7 and 8. One of the sprockets of each set cooperates with one of the chains 3 or 4. Synchronous movement of the chains 3 and 4 is effected by means of a shaft 9 that extends between the sprockets 5 and a shaft 10 on which sprockets 8 are rigidly mounted. The conveyor system is driven from any convenient source of power through a chain and sprocket connection 11. The shaft 10 for the sprockets 8 has adjustable bearing brackets 12 for taking up any slack that may develop in the conveyor chains 3 and 4.

Figure 3:
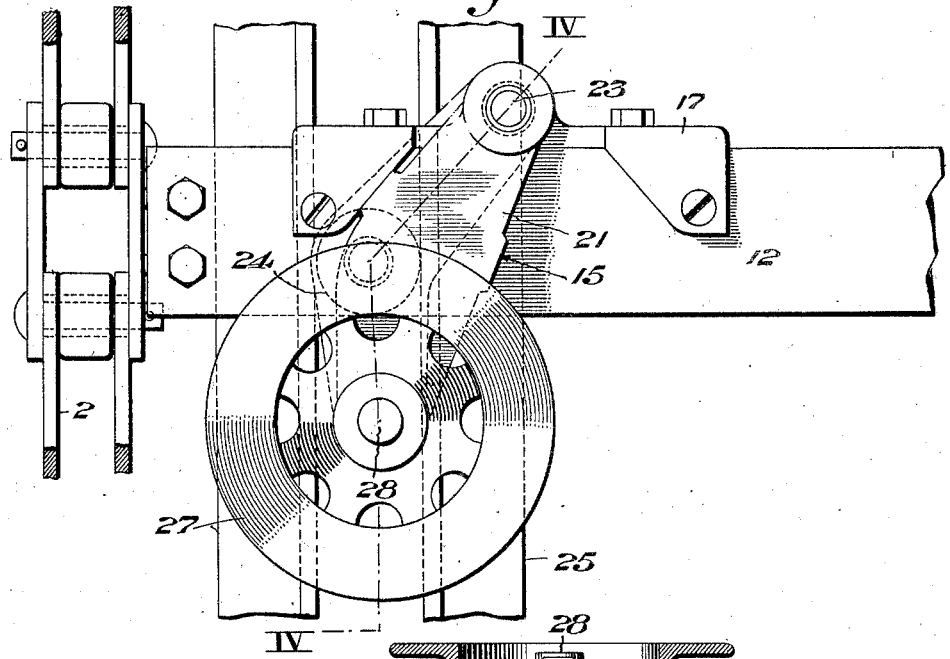
Fig. 3 is a detailed plan view, with portions broken away, of one of the machine parts.
Figure 4:
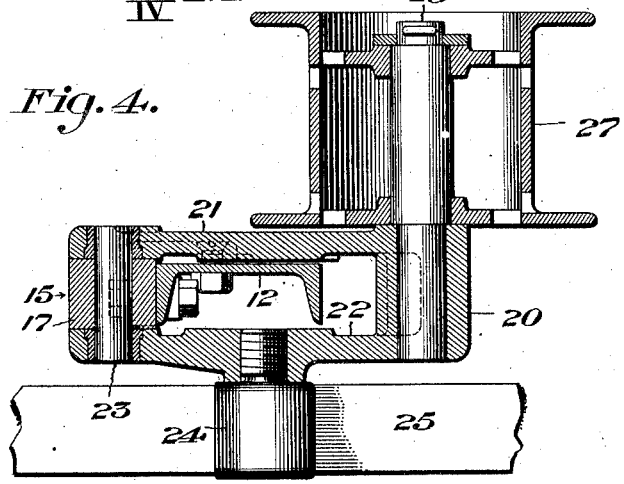
Fig. 4 is a sectional view of the machine part shown in Fig. 3.

A plurality of channel irons 13 are carried between oppositely disposed links of the respective conveyor chains. Swingable arms 15 and 16 are, respectively, pivotally mounted adjacent the ends of each of the channel irons 13 by means of brackets 17 that are bolted to the corresponding ends of the channel iron as illustrated in Figs. 3 and 4. Each of the arms 15 and 16 comprises a base portion 20 and bifurcated portions 21 and 22 that embrace the corresponding bracket 17 and channel iron 13. A pivot pin 23 swingably connects the extremities of the bifurcated portions 21 and 22 to the bracket 17 which is bolted to the channel iron. The lower bifurcated portion 22 has a guide roller 24 mounted thereon that is adapted to engage one of the cam tracks 25 or 26 that are mounted on the bottom of the tank and are adapted to swing the arms 15 and 16 on their respective pivots 23 in accordance with the position of the arms in the tank. A drum 27 is rotatably mounted on the base portion 20 by means of a pivot pin 28. Each of the channel irons 13 has one of the arms 15 or 16 mounted adjacent each end.

The two sets of cam tracks 25 and 26 are respectively mounted on the bottom of the tank 1 adjacent its sides. Each cam track embodies an angle iron 30 that serves to engage the inner side of the rollers 24 and an outer guide rail 31 that extends beyond the ends of the inner track 30. The ends of the tracks 25 converge near the ends of the tank and are substantially parallel over the intermediate portion thereof. The end of each of the guide rails 31, at the receiving end of the tank, have divergent end portions 32 for initially engaging the respective guide rollers 24 to swing the arms 15 and 16 to their innermost positions as they advance over the receiving end of the tank.

Water is generally employed as the testing liquid for use in testing operations of this nature. In order to render the working conditions more comfortable for the operator, the water is warmed by means of a heating coil 33. This is desirable since the operators necessarily handle the submerged articles being tested. Furthermore, the articles dry more quickly if warm water is employed.

The operation of my device is described for the testing of pneumatic tubes for tires which are regarded as representative of the general class of inflatable objects that require testing for porosity.

Figure 2:
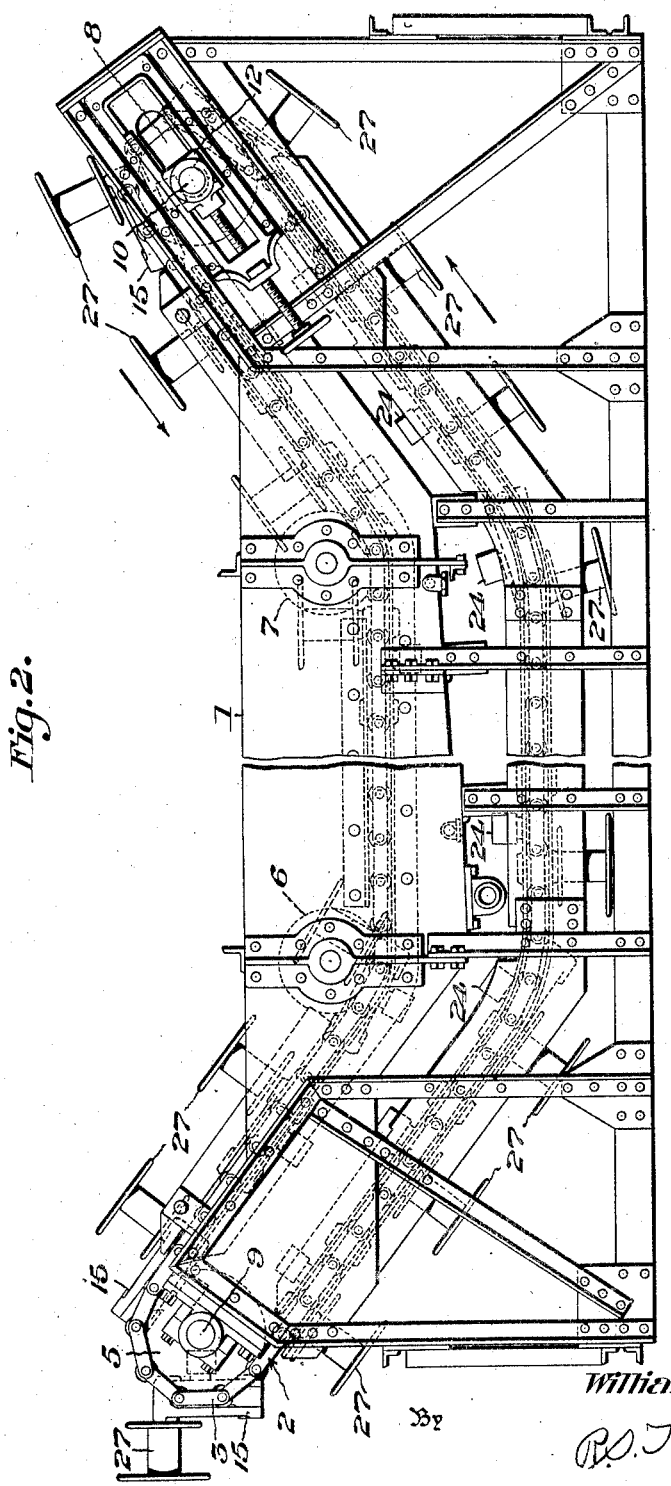
Fig. 2 is a diagrammatic elevational view of the machine shown in Fig. 1.

The inner tubes are partially inflated and delivered to the operator at the receiving end of the tank at any desired rate of speed. Each of these tubes, one of which is indicated in dotted outline 34 as applied to the receiving drums in Fig. 1, is mounted on the oppositely disposed pairs of drums 27 as these drums advance over the receiving end of the tank. Since the conveyor system moves in the direction of the arrows shown in Fig. 2, the pair of drums 27 are initially swung inwardly toward each other in this relative position by the engagement of their respective controlling rollers 24 with the cam tracks 25 and 26. The partially inflated tubes 34 may, therefore, readily be placed over the pair of receiving drums 27 as they traverse the receiving end of the tank and thereby be tensioned and submerged during their travel through the tank.

As the drums on which the tube is mounted proceed through the tank, the divergent cam tracks 25 and 26 engage the respectively cooperating guide rollers 24 to swing the arms 15 and 16 in opposite directions and thus to stretch the pneumatic tube that is mounted on these arms. The pairs of sprockets 6 and 7 direct the conveyor chains along the bottom of the tank and thus submerge the tubes in the liquid contained in the tank during the period of test.

An operator preferably stands on each side of the tank and inspects the tubes for porosity during their progress through the tank. As the tubes move forward, the operators change the position of the tube on the rotatable drums 27 to observe the entire length of the tube during the testing operation. Since the several drums 27 are pivotally mounted, any desired section of the tube may be thoroughly inspected.

After the tubes have traversed the tank, they emerge at the delivering end, the drums are swung inwardly by the convergent cam tracks, and the tested tubes are readily removed from the drums and classified in accordance with the results of the test.

Although I have described a single mechanism for performing the mechanical functions of my method of testing, it is evident that many modifications in the testing structure may be effected without departing from the spirit and scope of my invention and I, therefore, desire that only such limitations shall be imposed on my invention as are indicated in the appended claims.

What I claim is:

1. A tube testing machine comprising a tank, a pair of arms adapted to receive the tube to be tested, and means dependent upon the relative positions of the tubes within the tank for automatically separating the arms to stretch the tube when it is placed within the tank.

2. A machine for testing inflatable objects comprising a tank, a conveyor for moving the objects to be tested in series through the tank, and means associated with the conveyor for automatically deforming the objects during their movement through the tank.

3. A machine for testing pneumatic objects comprising a tank, a conveyor adapted to move the objects in series through the tank, and means dependent upon the position of the objects within the tank for successively deforming the objects during their movement through the tank.

4. A machine for testing pneumatic objects which comprises a testing tank, a conveyor adapted to move the objects to be tested in series through the tank, and means operated in accordance with the position of the objects within the tank for deforming the objects during their movement through the tank.

5. A testing machine comprising a conveyor adapted to pass through a tank, a plurality of pairs of arms pivotally mounted on the conveyor and adapted to swing in the plane thereof, and means for operating the arms in accordance with the position of each pair of arms relative to the tank, the conveyor being adapted to successively advance each pair of arms to operative position relative to the tank.

6. A conveyor comprising a pair of chains, a plurality of link members extending between the chains and respectively connected thereto, a swingable article-receiving arm mounted on one of the link members, and means for operating the arm in accordance with the position of the chains.

7. A machine comprising a tank partially enclosing a conveyor having a plurality of pairs of pivotally mounted arms, and means for operating the arms on their respective pivots in accordance with their respective positions within the tank, the conveyor being adapted to advance successively each pair of arms to operative relation within the tank.

8. A machine for testing pneumatic tubes comprising a container adapted to receive a testing liquid, means for successively submerging a series of tubes one after the other within the liquid, and means for stretching the tubes as they are submerged.

9. A testing machine comprising a receiving tank, a member upon which a test article is adapted to be mounted, conveyor means to advance the member through the tank and means to deform substantially the entire article as it is submerged within the tank.

10. A machine for testing the porosity of inflatable inner tubes comprising a container adapted to receive a testing liquid, a conveyor, mechanism on the conveyor adapted to receive tubes to be tested, a portion of the conveyor being submerged in said liquid, and means for actuating the mechanism to stretch the tubes during the period of submergence and to contract them to their normal condition during their removal from the testing liquid.

11. A machine for testing the porosity of inflatable tubes comprising a container adapted to receive a testing liquid, a conveyor, a plurality of arms pivotally mounted on the conveyor to swing in the plane thereof, a portion only of the conveyor being adapted to be submerged in the container, and a pair of cam tracks adapted to operate said arms in accordance with the position of the conveyor.

12. The process of testing an inflatable object for porosity which consists in partially inflating the object and subjecting the entire object to mechanical tension during the testing operation.

13. The process of testing an inflatable object for porosity which consists in inflating the object, mechanically tensioning the object as a unit, and testing the object for porosity by completely submerging the same while inflated and tensioned.

14. The process of testing a pneumatic tube for porosity which consists in partially inflating the tube, stretching the entire tube at the same time and immersing the tube in the testing bath in its stretched condition.

15. A machine for testing fluid-receiving objects of pliable material comprising means adapted to engage different portions of the object being tested, means adapted to separate the engaged portions of the object to a greater degree than the normal relation of the portions thereby to tension mechanically the side walls of the object, and means adapted to test the object for porosity while it is in a tensioned condition.

16. A machine for testing elongated fluid-receiving objects of rubber comprising means adapted to engage different portions of the objects, means adapted to separate the engaging means thereby to tension mechanically substantially all parts of the side walls of the objects, and means of testing the porosity of the objects in their tensioned condition.

17. The process of testing pneumatic tubes of rubber for porosity which consists in inserting fluid within the tubes, elongating the object to tension materially its side walls substantially throughout their entirety and to increase materially the pressure of the fluid within the object, and testing the object for porosity of its side walls while in the stretched condition.

In witness whereof I have hereunto signed my name.

WILLIAM STEPHENS.